Feb. 2, 1926.

M. P. FISHBURN

AUTO WRENCH

Filed June 16, 1925

1,571,580

Inventor

M. P. Fishburn

By C. A. Snow & Co.

Attorneys.

Patented Feb. 2, 1926.

1,571,580

UNITED STATES PATENT OFFICE.

MOSES P. FISHBURN, OF CARTHAGE, MISSOURI.

AUTO WRENCH.

Application filed June 16, 1925. Serial No. 37,506.

*To all whom it may concern:*

Be it known that I, MOSES P. FISHBURN, a citizen of the United States, residing at Carthage, in the county of Jasper and State of Missouri, have invented a new and useful Auto Wrench, of which the following is a specification.

This invention relates to automobile tools and more particularly to combination tools of this character.

The object of the invention is to provide a combination tire tool, tire lug wrench, spark-plug wrench, hub-cap wrench, and hammer which is of simple and economical construction and which is so constructed that the end thereof will not hit the hub of the wheel when removing lugs, and when used as a spark-plug wrench will fit down into the socket in which the plug is inserted and obtain a good grip of the plug and which is so shaped that it may be turned around and miss the bolt heads which connect the engine block in position.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1:
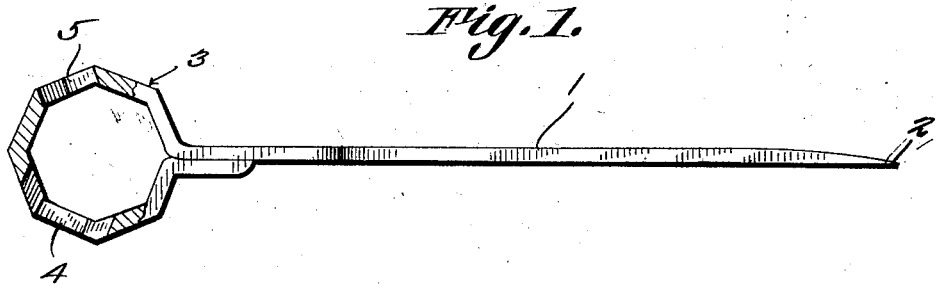
Figure 1 represents a plan view partly in section of a tool constructed in accordance with this invention.
Figure 2:
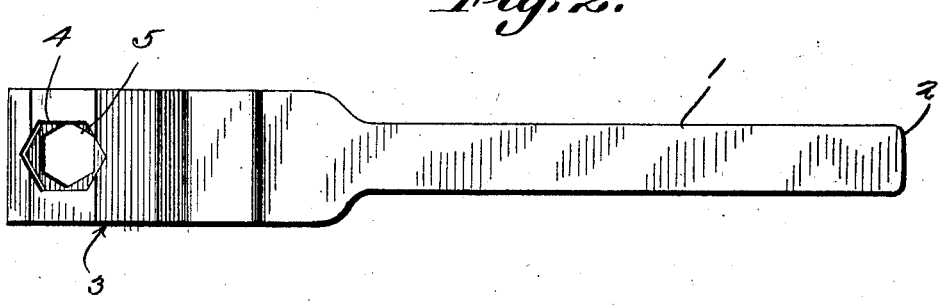
Fig. 2 is a side elevation thereof.
Figure 3:
Fig. 3 is a similar view taken from the opposite side.

In the embodiment illustrated a flat bar is provided which is cut away to provide a handle 1, which is tapered in thickness toward its free end, as shown at 2, to adapt it for use as a tire iron. This bar 1 which is constructed of a good grade steel has one end thereof bent upon itself and secured to provide an octagonal head 3 at the end opposite the beveled end 2 and which is made preferably octagonal in cross-section to adapt it to fit hub caps which are this shape. This octagonal head 3 has an angular opening 4 in one side wall thereof which is shaped to fit spark-plugs and larger nuts, while in the opposite wall is an angular opening 5 designed for use in connection with the nuts of the lugs and other small bolts.

The handle or bar 1 of the tool is preferably made of a width to adapt it for use as a jack handle for an automobile jack. Some makes of cars have flat jack handles, and when making a tool of this character for those cars it is designed to use the handle portion 1 of the tool to fit the jack thereby embodying in the tool six functions.

The head 3 not only performs the function of a wrench for spark-plugs or lug-nuts and hub-caps, but also is designed for use as a hammer for use in taking tires off the rim and for removing the rims from the wheels.

As a lug wrench this tool is so shaped that the end of the tool does not hit the hub of the wheel, and when used as a spark-plug wrench it fits down into the socket into which the plug is inserted and obtains a good grip on the plug, and the outer surface of the wrench being octagonal in shape permits it to turn around and miss the bolt head which fits close to the spark-plugs. While the spark-plug is being removed or inserted after this wrench has been placed in position it need not be removed until the plug is either removed or put in as the case may be, since it works on the principle of a ratchet wrench and by just lifting it up a little to change the position of the wrench and letting it fall down into position the foregoing result is obtained.

The spark-plug wrench opening 4 fits nearly all of the larger nuts of the car while the smaller wrench opening 5 fits the smaller nuts, the tool being designed to fit about eighty per cent of the nuts of the car.

It is of course understood that the size of the tool and of all wrench openings to be made are to fit the car for which the tool is to be used, the one shown being designed for use on Ford cars.

I claim:—

A tool of the class described comprising a strip of sheet metal, one end of the strip of sheet metal being bent upon itself and constructed to provide an octagonal socket member, said socket member having various sized openings in the wall thereof, and said strip of sheet metal being cut away to provide a handle portion.

In testimony that I claim the foregoing as my own, I have hereto affixed my signature.

MOSES P. FISHBURN.